(12) United States Patent
Edwards et al.

(10) Patent No.: US 11,764,972 B2
(45) Date of Patent: Sep. 19, 2023

(54) GENERATING A HYBRID SECURITY CERTIFICATE USING MULTIPLE CRYPTOSYSTEMS

(71) Applicant: INTERNATIONAL BUSINESS MACHINES CORPORATION, Armonk, NY (US)

(72) Inventors: Jonathan William Edwards, Fayette, KY (US); David Wayne Glass, Georgetown, KY (US); David Howard Evans, Lexington, KY (US); Clifford Lee Hansen, Rochester, MN (US); James Richard Coon, Rochester, MN (US); Richard Victor Kisley, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 17/184,996

(22) Filed: Feb. 25, 2021

(65) Prior Publication Data
US 2022/0271944 A1    Aug. 25, 2022

(51) Int. Cl.
*H04L 9/32* (2006.01)
*H04L 9/08* (2006.01)
*H04L 9/30* (2006.01)

(52) U.S. Cl.
CPC .......... *H04L 9/3247* (2013.01); *H04L 9/0825* (2013.01); *H04L 9/3066* (2013.01); *H04L 9/3093* (2013.01); *H04L 9/3263* (2013.01)

(58) Field of Classification Search
None
See application file for complete search history.

(56) References Cited

U.S. PATENT DOCUMENTS

| | | |
|---|---|---|
| 7,685,423 B1 | 3/2010 | Walmsley et al. |
| 8,009,829 B2 | 8/2011 | Jueneman et al. |
| (Continued) | | |

FOREIGN PATENT DOCUMENTS

| | | | | |
|---|---|---|---|---|
| EP | 2672414 A1 | * | 12/2013 | .......... G06F 21/564 |
| WO | WO 2020/087152 A1 | | 5/2020 | |
| WO | WO-2020087152 A1 | * | 5/2020 | ......... H04L 63/0815 |

OTHER PUBLICATIONS

International Search Report & Written Opinion for International Application No. PCT/EP2022/052875, dated Jun. 13, 2022 (12 pages) (Year: 2022).

(Continued)

*Primary Examiner* — Benjamin E Lanier
(74) *Attorney, Agent, or Firm* — Teddi Maranzano, Esq.; Kevin P. Radigan, Esq.; HESLIN ROTHENBERG FARLEY & MESITI P.C.

(57) ABSTRACT

Processing within a computing environment is facilitated by generating a hybrid security certificate using multiple cryptosystems. The generating includes obtaining data for inclusion in the hybrid security certificate, and generating a first digital signature associated with a first cryptosystem to cover the data, and a second digital signature associated with a second cryptosystem to cover the data. The generating further includes providing the hybrid security certificate, where the hybrid security certificate includes the data, the first digital signature associated with the first cryptosystem, and the second digital signature associated with the second cryptosystem, and where the first digital signature has no dependency on a key of the second cryptosystem or the second digital signature, and the second digital signature has no dependency on a key of the first cryptosystem or the first digital signature.

11 Claims, 12 Drawing Sheets

(56) References Cited

U.S. PATENT DOCUMENTS

| | | | | |
|---|---|---|---|---|
| 9,660,978 | B1* | 5/2017 | Truskovsky | H04L 63/0823 |
| 9,794,249 | B1 | 10/2017 | Truskovsky et al. | |
| 10,425,401 | B1* | 9/2019 | Pecen | H04L 63/0815 |
| 10,841,295 | B1 | 11/2020 | Pecen et al. | |
| 2008/0270788 | A1 | 10/2008 | Peters | |
| 2020/0410096 | A1* | 12/2020 | Zagorsky | G06F 21/566 |
| 2021/0006417 | A1* | 1/2021 | Pala | H04L 9/14 |

OTHER PUBLICATIONS

Anonymous, "Method and System for a Uniform Electronic Signature Interface", ip.com, IPCOM000170041D, published May 7, 2008 (49 pages).

Anonymous, "Mechanism to Support Single Certificate for Different Public Keys in Cloud Deployments", ip.com, IPCOM000244693D, published Jan. 6, 2016 (5 pages).

Acar, Tolga, "Mechanism and Policy to Manage Cryptographic Module Certification Properties", ip.com, IPCOM000140949D, published Sep. 26, 2006 (9 pages).

Bindel et al., "X.509-Compliant Hybrid Certificates for the Post-Quantum Transition", The Journal of Open Source Software, 4(40), published Online at: https://doi.org/10.2105/joss.01606, Aug. 12, 2019 (3 pages).

Crockett et al., "Prototyping Post-Quantum and Hybrid Key Exchange and Authentication in TLS and SSH", NIST 2nd PQC Conference, Aug. 22, 2019 (23 pages).

Ducas et al., "CRYSTALS-Dilithium: A Lattice-Based Digital Signature Scheme", IBM Publication, IACR Transactions on Cryptographic Hardware and Embedded Systems, Year: 2018, https://hal.archives-ouvertes.fr/hal-01934176 (31 pages).

IBM Publication, "z/Architecture Principles of Operation," IBM® Publication No. SA22-7832-12, 13th Edition, Sep. 2019 (pp. 1-2000).

Isara Corp., "Enabling Quantum-Safe Migration with Crypto-Agile Certificates", published May 16, 2018 (7 pages).

Gladiator, Luca, "Hybrid Certificates in OpenSSL", submitted/published Mar. 20, 2019 (8 pages).

Mel et al., "The NIST Definition of Cloud Computing," National Institute of Standards and Technology, Information Technology Laboratory, Special Publication 800-145, Sep. 2011 (pp. 1-7).

Pereira, G.C.F., "Internet X.509 Public Key Infrastructure: Additional Post-Quantum Signature Algorithms and Identifiers", published Online at: https://tools.ietf.org/html/draft-pereira-pq-signature-oids-00#section-3.1, Nov. 20, 2019 (13 pages).

* cited by examiner

500 — GENERATING A HYBRID SECURITY CERTIFICATE USING MULTIPLE CRYPTOSYSTEMS, THE GENERATING INCLUDES:

502 — OBTAINING DATA FOR INCLUSION IN THE HYBRID SECURITY CERTIFICATE;

504 — GENERATING A FIRST DIGITAL SIGNATURE ASSOCIATED WITH A FIRST CRYPTOSYSTEM OF THE MULTIPLE CRYPTOSYSTEMS TO COVER THE DATA;

506 — GENERATING A SECOND DIGITAL SIGNATURE ASSOCIATED WITH A SECOND CRYPTOSYSTEM OF THE MULTIPLE CRYPTOSYSTEMS TO COVER THE DATA; AND

508 — PROVIDING THE HYBRID SECURITY CERTIFICATE, WHERE THE HYBRID SECURITY CERTIFICATE INCLUDES THE DATA, THE FIRST DIGITAL SIGNATURE ASSOCIATED WITH THE FIRST CRYPTOSYSTEM, AND THE SECOND DIGITAL SIGNATURE ASSOCIATED WITH THE SECOND CRYPTOSYSTEM, AND WHERE THE FIRST DIGITAL SIGNATURE HAS NO DEPENDENCY ON A KEY OF THE SECOND CRYPTOSYSTEM OR THE SECOND DIGITAL SIGNATURE, AND THE SECOND DIGITAL SIGNATURE HAS NO DEPENDENCY ON A KEY OF THE FIRST CRYPTOSYSTEM OR THE FIRST DIGITAL SIGNATURE

510 — GENERATING THE FIRST DIGITAL SIGNATURE ASSOCIATED WITH THE FIRST CRYPTOSYSTEM COVERS THE DATA INDEPENDENT OF THE SECOND CRYPTOSYSTEM, AND GENERATING THE SECOND DIGITAL SIGNATURE ASSOCIATED WITH THE SECOND CRYPTOSYSTEM COVERS THE DATA INDEPENDENT OF THE FIRST CRYPTOSYSTEM, WHERE THE DATA DOES NOT INCLUDE OR DEPEND ON ANY ATTRIBUTE OR KEY OF THE FIRST CRYPTOSYSTEM OR THE SECOND CRYPTOSYSTEM

512 — THE FIRST CRYPTOSYSTEM INCLUDES AN ASYMMETRIC CRYPTOSYSTEM AND THE SECOND CRYPTOSYSTEM INCLUDES A QUANTUM-RESISTANT CRYPTOSYSTEM

514 — THE QUANTUM-RESISTANT CRYPTOSYSTEM INCLUDES A LATTICE-BASED CRYPTOGRAPHIC APPROACH

516 — THE FIRST CRYPTOSYSTEM INCLUDES AN ELLIPTIC-CURVE CRYPTOGRAPHY (ECC) CRYPTOSYSTEM, AND THE SECOND CRYPTOSYSTEM INCLUDES A DILITHIUM CRYPTOSYSTEM

THE GENERATING THE HYBRID SECURITY CERTIFICATE FURTHER INCLUDES:

ASSOCIATING A FIRST PUBLIC KEY WITH THE DATA, THE FIRST PUBLIC KEY BEING ASSOCIATED WITH THE FIRST CRYPTOSYSTEM; AND

WHERE GENERATING THE FIRST DIGITAL SIGNATURE USES A FIRST PRIVATE KEY IN GENERATING THE FIRST DIGITAL SIGNATURE ASSOCIATED WITH THE FIRST CRYPTOSYSTEM TO COVER THE DATA, AND WHERE GENERATING THE FIRST DIGITAL SIGNATURE USES PROPERTIES OF THE FIRST PUBLIC KEY

520

THE GENERATING THE HYBRID SECURITY CERTIFICATE FURTHER INCLUDES:

ASSOCIATING A SECOND PUBLIC KEY WITH THE DATA, THE SECOND PUBLIC KEY BEING ASSOCIATED WITH THE SECOND CRYPTOSYSTEM; AND

WHERE GENERATING THE SECOND DIGITAL SIGNATURE USES A SECOND PRIVATE KEY TO GENERATE THE SECOND DIGITAL SIGNATURE ASSOCIATED WITH THE SECOND CRYPTOSYSTEM TO COVER THE DATA, AND WHERE GENERATING THE SECOND DIGITAL SIGNATURE USES PROPERTIES OF THE SECOND PUBLIC KEY

522

THE GENERATING THE HYBRID SECURITY CERTIFICATE FURTHER INCLUDES:

GENERATING A THIRD DIGITAL SIGNATURE ASSOCIATED WITH A THIRD CRYPTOSYSTEM TO COVER THE DATA; AND

WHERE PROVIDING THE HYBRID SECURITY CERTIFICATE INCLUDES PROVIDING THE HYBRID SECURITY CERTIFICATE WITH THE DATA, THE FIRST DIGITAL SIGNATURE ASSOCIATED WITH THE FIRST CRYPTOSYSTEM, THE SECOND DIGITAL SIGNATURE ASSOCIATED WITH THE SECOND CRYPTOSYSTEM, AND THE THIRD DIGITAL SIGNATURE ASSOCIATED WITH THE THIRD CRYPTOSYSTEM, WHERE THERE IS NO DEPENDENCY BETWEEN THE FIRST DIGITAL SIGNATURE, THE SECOND DIGITAL SIGNATURE, AND THE THIRD DIGITAL SIGNATURE

524

THE PROVIDING THE HYBRID SECURITY CERTIFICATE INCLUDES WRAPPING THE DATA, THE FIRST DIGITAL SIGNATURE AND THE SECOND DIGITAL SIGNATURE IN A SINGLE DISTINGUISHED ENCODING RULE (DER) SEQUENCE

526

THE HYBRID SECURITY CERTIFICATE INCLUDES A SIGNERINFO BLOCK INCLUDING A FIRST PUBLIC KEY ASSOCIATED WITH THE FIRST CRYPTOSYSTEM, THE FIRST DIGITAL SIGNATURE, AND A SECOND PUBLIC KEY ASSOCIATED WITH THE SECOND CRYPTOSYSTEM AND THE SECOND DIGITAL SIGNATURE

FIG. 5B

GENERATING A HYBRID SECURITY CERTIFICATE USING MULTIPLE CRYPTOSYSTEMS

BACKGROUND

One or more aspects relate, in general, to facilitating processing within a computing environment, and in particular, to facilitating secure communication within a computing environment. Cryptography systems can be used in a variety of computing environments to facilitate communicating securely between entities of the environment.

Computing environments can include different types of processors to enhance processing. As an example, a computing environment can include one or more central processing units (CPUs), which are considered main processors, and one or more adjunct processors that are considered subordinate to the CPUs. An adjunct processor typically performs specific types of tasks. For instance, a particular example of an adjunct processor is a cryptographic (crypto) card used to perform cryptographic operations.

SUMMARY

Certain shortcomings of the prior art are overcome and additional advantages are provided through the provision, in one or more aspects, of a computer program product for facilitating processing within a computing environment. The computer program product includes one or more computer-readable storage media and program instructions collectively stored on the one or more computer-readable storage media to perform a method. The method includes generating a hybrid security certificate using multiple cryptosystems. The generating includes obtaining data for inclusion in the hybrid security certificate, generating a first digital signature associated with a first cryptosystem of the multiple cryptosystems to cover the data, and generating a second digital signature associated with a second cryptosystem of the multiple cryptosystems to cover the data. Further, generating the hybrid security certificate includes providing the hybrid security certificate, where the security certificate includes the data, the first digital signature associated with the first cryptosystem, and the second digital signature associated with the second cryptosystem, and where the first digital signature has no dependency on a key of the second cryptosystem or the second digital signature, and the second digital signature has no dependency on a key of the first cryptosystem or the first digital signature. Advantageously, by including a first digital signature and a second digital signature in the hybrid security certificate, a more flexible and robust security certificate is provided. Further, the multiple cryptosystems used to generate the hybrid security certificate can include any available first and second cryptosystems. In addition, generation of a hybrid security certificate using multiple cryptosystems as disclosed herein advantageously facilitates transition of cryptographic security from one cryptography system standard to another cryptography system standard. In accordance with one or more aspects, there is no dependency between the first and second digital signatures of the hybrid security certificate.

In one or more embodiments, generating the first digital signature associated with the first cryptosystem covers the data independent of the second cryptosystem, and the second digital signature associated with the second cryptosystem covers the data independent of the first cryptosystem, where the data does not include or depend on any attribute or key of the first cryptosystem or the second cryptosystem. Advantageously, with hybrid security certificate generation as disclosed herein, no signature needs to be updated or changed if an attribute of a coincident signature changes. Further, each signature is easier to write code for and parse, since each signature over the data is independent from the other.

In one embodiment, the first cryptosystem includes an asymmetric cryptosystem, and the second cryptosystem includes a quantum-resistant cryptosystem. In one implementation, the quantum-resistant cryptosystem includes a lattice-based cryptographic approach. As one example, the first cryptosystem is an elliptic-curve cryptography (ECC) cryptosystem, and the second cryptosystem is a Dilithium cryptosystem. Advantageously, the hybrid security certificate generation disclosed herein can include a first cryptosystem that is a certified security system, such as a certified asymmetric cryptosystem, and a second cryptosystem that is yet-to-be certified, but is a more quantum-resistant security system. For instance, in one implementation, the first cryptosystem can be a National Institute of Standards and Technology (NIST) certified security system, and the second cryptosystem can be, for instance, an as-yet-certified quantum-resistant cryptographic system.

In one or more embodiments, generating the hybrid security certificate includes associated a first public key with the data, where the first public key is associated with the first cryptosystem, and generating the first digital signature uses a first private key in generating the first digital signature associated with the first cryptosystem to cover the data, where the generating the first digital signature uses properties of the first public key. In one or more further embodiments, generating the hybrid security certificate includes associated a second public key with the data, where the second public key is associated with the second cryptosystem. Further, generating the second digital signature uses a second private key to generate the second digital signature associated with the second cryptosystem to cover the data, where generating the second digital signature uses properties of the second public key. Advantageously, generating the first digital signature has no dependency on the second public key, the second digital signature, or any attribute of the second cryptosystem, and generating the second digital signature has no dependency on the first public key, the first digital signature, or any attribute of the first cryptosystem, with the first digital signature and the second digital signature each independently covering the data.

In one or more embodiments, generating the hybrid security certificate further includes generating a third digital signature associated with a third cryptosystem to cover the data, and providing the hybrid security certificate includes providing the hybrid security certificate with the data, the first digital signature associated with the first cryptosystem, the second digital signature associated with the second cryptosystem, and the third digital signature associated with the third cryptosystem, where there is no dependency between the first digital signature, the second digital signature and the third digital signature. Advantageously, the hybrid security certificate generation disclosed herein is extendible to any number N of signature formats, or cryptosystems (where N≥2), such as three or more independent signatures being utilized in the certificate to cover the data, without dependency between the signatures. In this manner, a more robust hybrid security certificate is provided.

In one embodiment, providing the hybrid security certificate further includes wrapping the data, the first digital signature and the second digital signature in a single Distinguished Encoding Rule (DER) sequence.

Further, in one or more implementations, the hybrid security certificate includes a SignerInfo block including a first public key associated with the first cryptosystem, the first digital signature, and a second public key associated with the second cryptosystem and the second digital signature.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5A-5B depict one embodiment of aspects related to facilitating processing within a computing environment, in accordance with one or more aspects of the present invention;

DETAILED DESCRIPTION

Figure 1A:
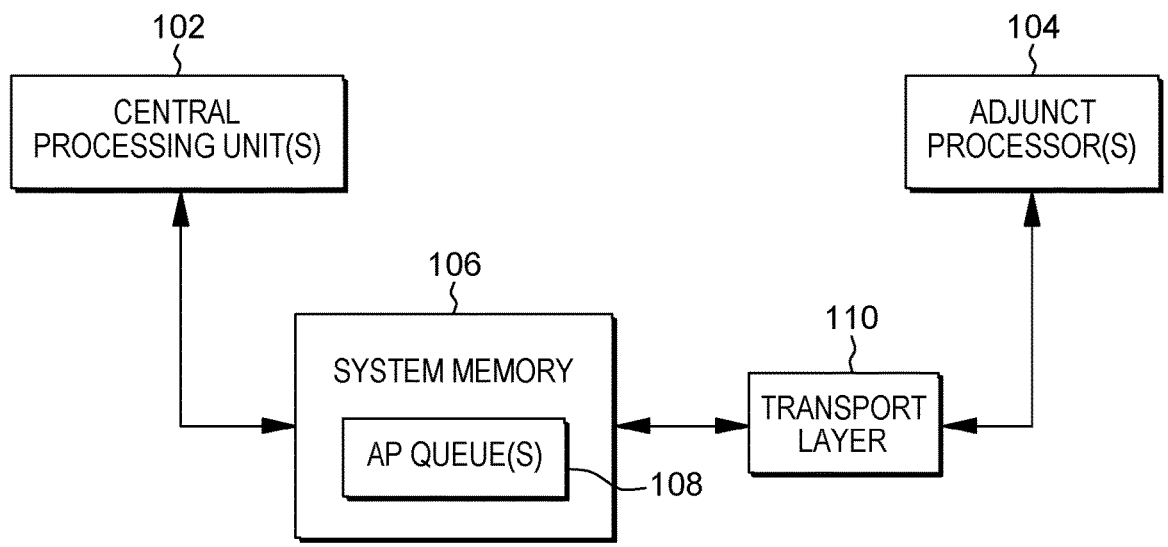
FIG. 1A depicts one embodiment of a computing environment to incorporate and use one or more aspects of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, cryptosystems, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, cryptosystems, protocols, layouts, schematics or tools, only as examples, and not by way of limitation. Further, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 6A:
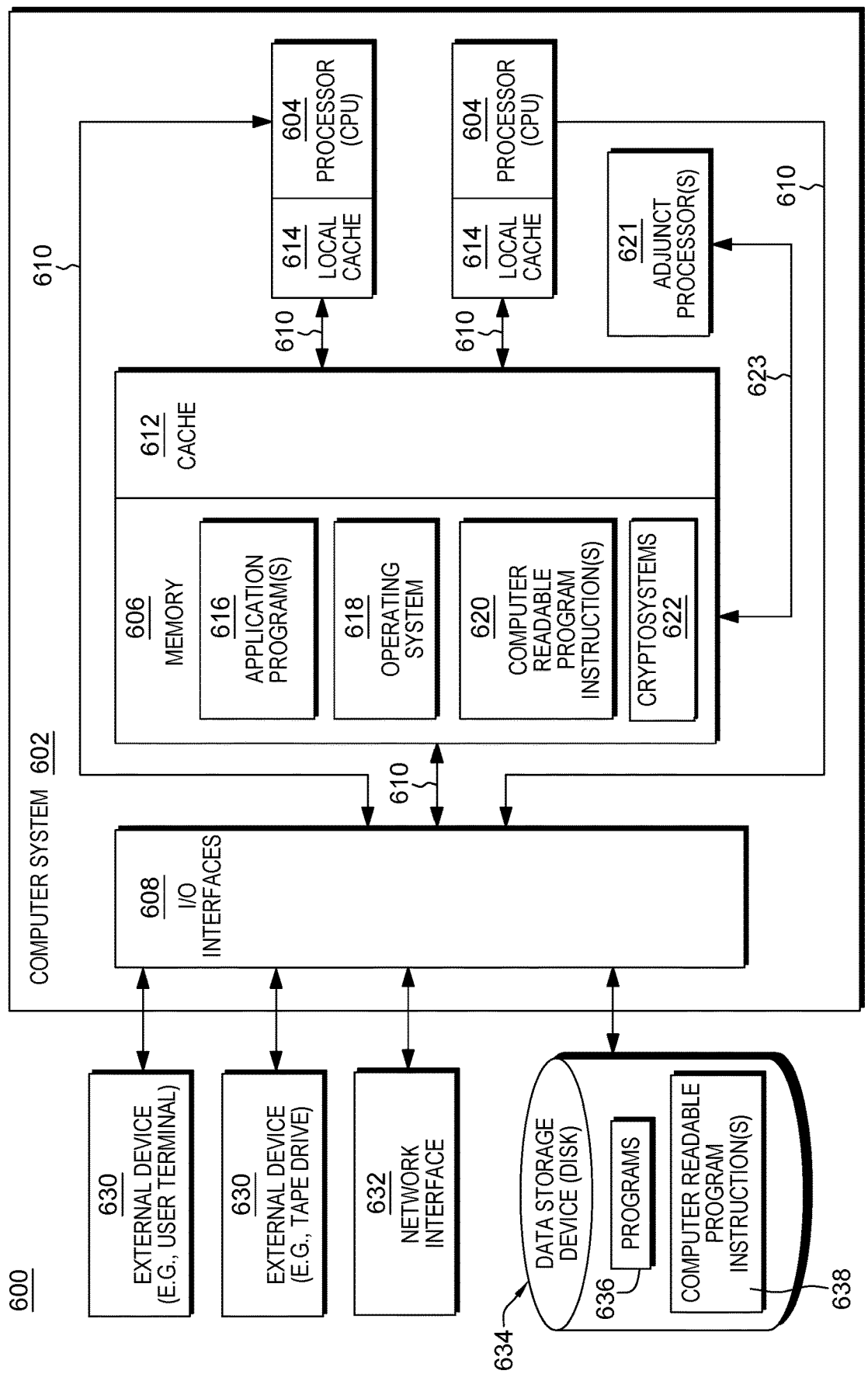
FIG. 6A depicts one example of a computing environment to incorporate and use one or more aspects of the present invention.

As understood by one skilled in the art, program code, as referred to in this application, can include both software and hardware. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 6A as one or more of application program(s) 616, computer-readable program instruction(s) 620, and/or cryptosystems 622, stored in memory 606 of computer system 602, as well as programs 636 and computer-readable program instruction(s) 638, stored in a data storage device 634 accessed by computer system 602.

As noted, cryptography systems can be used in a variety of computing environments to facilitate secure communication. In one or more embodiments, a cryptography system (or cryptosystem) provides a security certificate, or digital certificate, to facilitate the secure communication, such as within a computing system or between computing systems.

More particularly, cryptography is an essential tool in secure processing. When an application must communicate with other distributed elements, or assert or ascertain the validity of data that is being processed, cryptography is typically used. As noted, in one or more embodiments, computing environments can include different types of processors to enhance processing. As an example, a computing environment can include one or more central processing units (CPUs), which are considered main processors, and one or more adjunct processors, which are considered subordinate to the CPUs. An adjunct processor typically performs specific types of tasks. For instance, a particular type of adjunct processor is a cryptographic (crypto) card used to perform cryptographic operations.

An example of a cryptographic card, offered by International Business Machines Corporation, Armonk, New York (USA), is a IBM® 4769 PCIe cryptographic coprocessor, which is a hardware security module (HSM) that includes a secure coprocessor implemented on a high-security, tamper-resistant, programmable Peripheral Component Interconnect express (PCIe) board. (IBM is a registered trademark of International Business Machines Corporation in at least one jurisdiction.) Specialized cryptographic electronics, microprocessor, memory, and random number generator housed within a tamper-respondent environment provide a highly secure subsystem in which data processing and cryptography can be performed. Sensitive key material is never exposed outside the physically secure boundary in a clear format.

The IBM 4769 PCIe cryptographic coprocessor is designed to meet the Federal Information Processing Standard (FIPS) 140-2 Level 4, the highest level of certification available for commercial cryptographic devices. This cryptographic card can be used as part of a pervasive encryption and enterprise security system.

For instance, an example of a cryptographic card application offered by International Business Machines Corporation, Armonk, New York (USA), is a channel-attached Crypto Express™ card (where Crypto Express is a trademark of International Business Machines Corporation in at least one jurisdiction). A Crypto Express card is defined to support multiple types of commands, such as commands using encrypted keys, commands using clear keys, hash commands, query commands, random number-generator commands, etc. Further, a Crypto Express card is designed to support multiple modes, such as, for instance, a common cryptographic architecture (CCA) mode, an accelerator mode, and an Enterprise Public Key Cryptographic Standards (PKCS) (a.k.a., XCP/EP11-Enterprise PKCS #11 mode). Each mode can be configured to process specific types of commands. By way of example, applications can include financial PIN transactions, bank-to-clearing house transactions, credit transactions for integrated circuit (chip) based credit cards, general purpose cryptographic applications using symmetric key algorithms, hashing algorithms, public key algorithms, etc. In one or more implementations, the operational keys (symmetric or asymmetric private (RSA or Elliptic-Curve)) are generated in the coprocessor and then saved, for instance, in a keystore file or in application memory, encrypted under the master key of that coprocessor. Any coprocessor with an identical matching key can then use those keys. In one or more implementations, cryptographic systems and/or cards such as described herein can be supported on certain mainframe computing environments, such as the IBM z/Architecture® computing environment (where z/Architecture® is a registered trademark of International Business Machines Corporation in at least one jurisdiction).

A certificate (referred to herein as a security certificate or digital certificate) is an electronic document or data file used to prove ownership and authenticity of a cryptographic key. Certificates currently in use typically incorporate a single cryptosystem, that is, the certificate contains one key and one signature, both generated using the same cryptosystem.

In practice, the cryptosystem is typically an asymmetric cryptosystem, such as an Elliptic-Curve Cryptography (ECC) cryptosystem.

The asymmetric cryptosystems in use today will become vulnerable to attack by algorithms running on quantum computers. It is therefore desirable to transition to a cryptosystem that is more resistant to attack, both by conventional computers and quantum computers. One candidate for such a cryptosystem the Dilithium cryptosystem, which is one of several lattice-based cryptographic approaches that can preserve security robustness, even in the presence of quantum computers.

Dilithium keys and signatures are much larger than ECC keys and signatures in use today. For instance, an ECC public key is about 160-bytes, an ECC signature is a little more than 200-bytes long, and an ECC private key is about 250-bytes long (although the private key can be more-or-less instantly recreated from just 72-bytes of secret data). In comparison, the corresponding values for Dilithium-strength keys are almost 2400-bytes, a little less than 4700-bytes, and over 7500-bytes, respectively. Further, a Dilithium private key can be recreated from about 64-bytes of secret data.

Currently, standards and certification bodies (such as the National Institute of Standards and Technology (NIST)) have not yet arrived on a standard quantum-resistant cryptosystem, and will not certify an implementation that relies for security solely on such a cryptosystem. As a solution, a hybrid security certificate approach such as disclosed herein can be employed.

As explained herein, in one or more implementations, program code executing on one or more processors generates a hybrid security certificate which includes two keys and two signatures, one set generated using a first cryptosystem, and another set generated using a second cryptosystem. For instance, in one implementation only, the first cryptosystem is a NIST certified, asymmetric cryptosystem, and the other cryptosystem is a quantum-resistant cryptosystem, yet-to-be NIST certified. In this manner, a hybrid security certificate generation facility is provided that broadly supports non-disruptive, upward migration between different cryptosystem standards. As future cryptosystem standards change, such as the length of keys and/or signatures, the hybrid security certificate generation facility disclosed herein can be employed. For example, in one implementation, in order to achieve certification, a crypto-adapter/card such as discussed above can continue to use a certified cryptosystem approach, such as an ECC cryptosystem, and also include a yet-to-be certified, more quantum-resistant cryptosystem approach. Thus, in one or more embodiments, to maintain NIST compliance, the hybrid security certificate generation facility disclosed herein utilizes multiple cryptosystems, and provides a hybrid security certificate which includes multiple keys and multiple digital signatures, where the key and signature pairs are independent of each other.

Embodiments of the present invention include a computer program product, a computer system and a method, where program code executing on one or more processors (such as one or more coprocessors or adjunct processors) generates a hybrid security certificate using multiple cryptosystems. The generating includes obtaining data for inclusion in the hybrid security certificate; generating a first digital signature associated with a first cryptosystem of the multiple cryptosystems to cover the data; and generating a second digital signature associated with a second cryptosystem of the multiple cryptosystems to cover the data. Generating the hybrid security certificate further includes providing the hybrid security certificate, with the hybrid security certificate including the data, the first digital signature associated with the first cryptosystem, and the second digital signature associated with the second cryptosystem, and where the first digital signature has no dependency on a key of the second cryptosystem or the second digital signature, and the second digital signature has no dependency on a key of the first cryptosystem or in the first digital signature.

In one or more embodiments, the program code executing on the one or more processors generates the first digital signature associated with the first cryptosystem to cover the data independent of the second cryptosystem, and generates the second digital signature associated with the second cryptosystem to cover the data independent of the first cryptosystem, where the data does not include or depend on any attribute or key of the first cryptosystem or the second cryptosystem. In one implementation, the data includes metadata to be secured, and certificate generate can be (for instance) in association with miniboot processing and/or authentication processing, such as outbound authentication manager processing. Further, in one embodiment, the first cryptosystem is an asymmetric cryptosystem, and the second cryptosystem is a quantum-resistant cryptosystem, such as a lattice-based cryptographic system. In one particular implementation, the first cryptosystem is an elliptic-curve cryptography (ECC) cryptosystem, and the second cryptosystem is a Dilithium cryptosystem.

In one or more implementations, generating the hybrid security certificate further includes program code executing on one or more processors associating a first public key with the data, where the first public key is associated with the first cryptosystem, and where the generating of the first digital signature utilizes a first private key in generating the first digital signature associated with the first cryptosystem to cover the data. The generating of the first digital signature further uses properties of the first public key. In one or more further embodiments, the program code executing on the one or more processors generates the hybrid security certificate by associating a second public key with the data, where the second public key is associated with the second cryptosystem, and where generating the second digital signature uses a second private key to generate the second digital signature associated with the second cryptosystem to cover the data. The generating of the second digital signature also utilizes properties of the second public key.

In one or more embodiments, program code executing on one or more processors generates the hybrid security certificate by generating a third digital signature associated with a third cryptosystem to cover the data, where providing the hybrid security certificate includes providing the hybrid security certificate with the data, the first digital signature associated with the first cryptosystem, the second digital signature associated with the second cryptosystem, and the third digital signature associated with the third cryptosystem, and where there is no dependency or overlap between the first digital signature, the second digital signature and the third digital signature.

In one or more implementations, generating the hybrid security certificate further includes wrapping the data, the first digital signature and the second digital signature in a single Distinguished Encoding Rule (DER) sequence. Further, in one embodiment, the generated hybrid security certificate includes a SignerInfo block including a first public key associated with the first cryptosystem, the first digital signature, and a second public key associated with the second cryptosystem and the second digital signature.

Embodiments of the present invention are inextricably tied to computing and provide significantly more than existing approaches to security certificates. For instance, embodiments of the present invention provide program code executing on one or more processors to exploit computing-centric data handling techniques in order to generate a hybrid security certificate using multiple cryptosystems. Advantageously, the program code executing on one or more processors provides the hybrid security certificate, where the hybrid certificate includes data protected by the certificate, a first digital signature associated with a first cryptosystem, and a second digital signature associated with a second cryptosystem, and where the first digital signature has no dependency on any attribute or key of the second cryptosystem or the second digital signature, and the second digital signature has no dependency on any attribute or key of the first cryptosystem or the first digital signature.

Both the interconnectivity of computing elements, systems or nodes utilized, and the computer-exclusive data processing techniques utilized by the program code, enable various aspects of the present invention. Further, embodiments of the present invention provide significantly more than existing approaches to generating security certificates by providing a hybrid security certificate where no signature section or subsection needs to be updated or changes if an attribute of a coincident signature section or subsection changes. Further, each signature of the hybrid certificate is easier to write code for and to parse, since each signature covering the data is independent from the other. Further, the fields or subsections of each certificate are not required to be zeroed, or to have any particular values before a given signature of the hybrid security certificate is determined. Further, the hybrid security certificate generation facility disclosed herein is extendable to any number N of signature formats or cryptosystems, such as three or more independent signatures being utilized to cover the data to be secured.

Advantageously, by including a first digital signature and a second digital signature, a more robust security certificate is provided, particularly in the presence of quantum computers. In one or more implementations, the first cryptosystem can be a NIST certified security system, and the second cryptosystem can be, for instance, an as-yet-certified quantum-resistant cryptographic system.

By way of example only, one embodiment of a computing environment to incorporate and use one or more aspects of the present invention is described with reference to FIG. 1A. In one example, a computing environment 100 includes at least one central processing unit 102 and at least one adjunct processor (AP) 104, each of which is coupled to at least a portion of memory, referred to as system memory 106. As one example, system memory 106 includes a hardware system area, which is indirectly accessible and not visible to programs executing on the central processing unit(s). (Indirectly accessible is used herein to mean that the hardware system area or adjunct processor queue(s) stored therein (described below) are only accessible by specific limited instructions and not otherwise accessible (e.g., cannot load into it, programs are unaware of addresses, etc.)). Located within the system memory are one or more adjunct processor queues 108. These queues are not directly visible from user programs and are instead considered a part of the machine (i.e., the machine that includes the central processing unit(s), system memory and adjunct processor(s)). A central processing unit has access to the queues in system memory by, for instance, issuing instructions to place requests on the queue, and/or to remove replies from the queue. The adjunct processor, however, does have direct access to the queues via, e.g., a transport layer 110, and is responsible for taking requests off the queue, processing the requests, and placing replies to the requests on the queue.

Figure 1B:
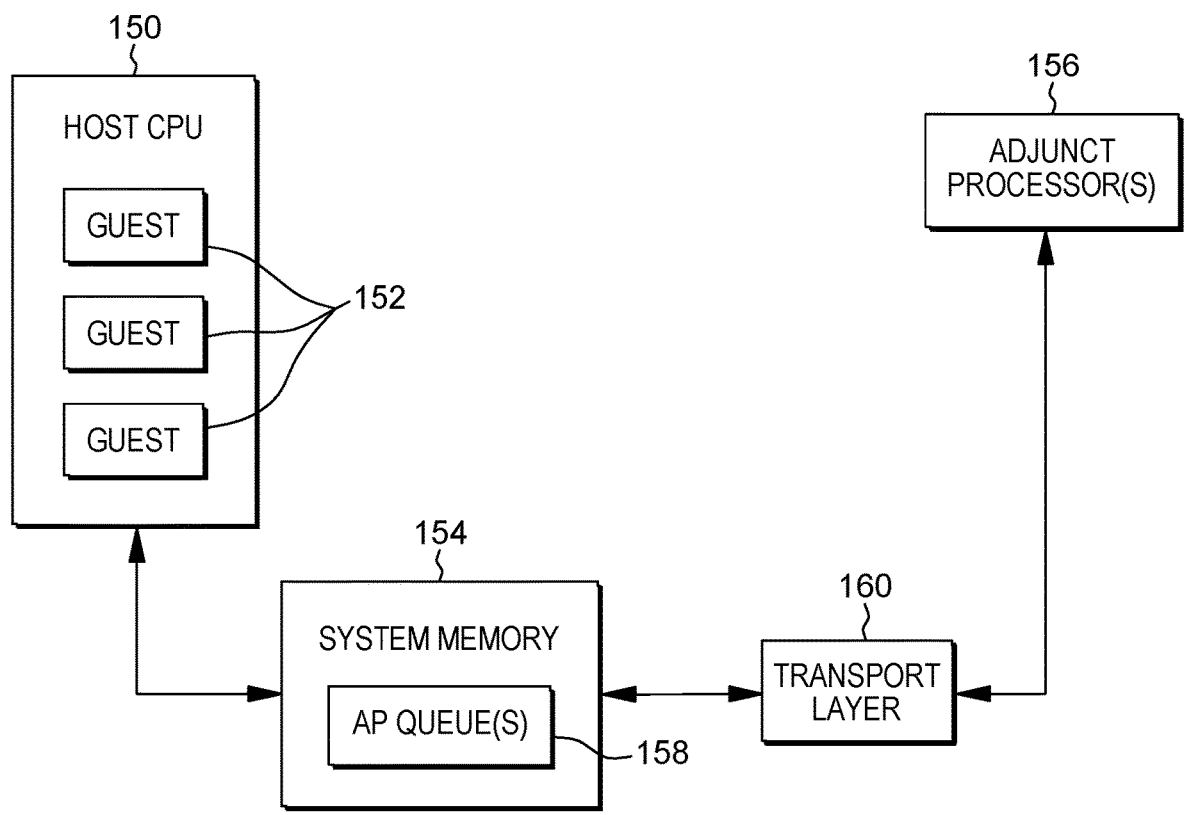
FIG. 1B depicts another embodiment of a computing environment to incorporate and use one or more aspects of the present invention.

Another embodiment of a computing environment to incorporate and use one or more aspects of the present invention is described with reference to FIG. 1B. In this embodiment, the machine includes virtual support, and there is at least one host central processing unit 150 that includes a plurality of guests 152 (e.g., guest operating systems and/or guest programs). The host central processing unit is coupled to at least a portion of memory, referred to as system memory 154. Additionally, there is at least one adjunct processor 156, which is also coupled to system memory 154, via, for instance, a transport layer 160. As one example, system memory 154 includes a hardware system area, and located within the system memory are one or more adjunct processor queues 158.

As indicated, there are different types of adjunct processors, including but not limited to, cryptographic cards or adapters. A specific example of a cryptographic card is a Crypto Express card offered by International Business Machines Corporation, Armonk, New York Although an example cryptographic card is provided, other cryptographic cards offered by International Business Machines Corporation and/or other companies may incorporate and/or use one or more aspects of the present invention. Further, other types of processors can incorporate and/or use one or more aspects of the present invention.

In one embodiment, an adjunct processor, such as a cryptographic card (e.g., a Crypto Express card), can support a plurality of modes including, but not limited to, a coprocessor mode, an accelerator mode, and an Enterprise Public Key Cryptographic Standards (PKCS) mode (e.g., XCP/EP11-Enterprise PKCS #11), as examples. Additional, fewer and/or other modes can be supported in other examples. Each of the modes can have its own AP message structures and formats.

As an example, an adjunct processor message is comprised of multiple data segments and the data segments may not be adjacent to each other; instead, one or more may be interleaved. These data segments are referred to as scatter gather data segments. In one example, a cryptographic card does not have direct access to the enqueued AP message and a portion of the message (e.g., the bottom part of the AP message) contains the data to be used by, e.g., the cryptographic card to execute the AP command. Therefore, the AP command transport layer (e.g., transport layer 110, 160) copies the relevant data from the AP command request message, packages it in a format that the cryptographic card understands (e.g., cryptographic card's command request message) and sends it to the cryptographic card. Similarly, after the AP command is executed by the cryptographic card, the AP command transport layer generates an AP command reply message using various parts of the AP command request message and the cryptographic card's command reply message and sends it to the AP queue to be dequeued later by the program.

Aspects of a hybrid security certificate facility are described herein with respect to a particular architecture, such as the z/Architecture® hardware architecture, offered by International Business Machines Corporation, Armonk, New York One embodiment of the z/Architecture® hardware architecture is described in "z/Architecture Principles of Operation", IBM Publication No. SA22-7832-12, 13th Edition, September 2019, which is hereby incorporated herein by reference in its entirety. The z/Architecture hardware architecture, however, is only one example architecture. Aspects of the invention may also be based on other architectures, including, but not limited to, the Intel x86 architectures, other architectures of International Business Machines Corporation, and/or architectures of other companies.

Figure 2:
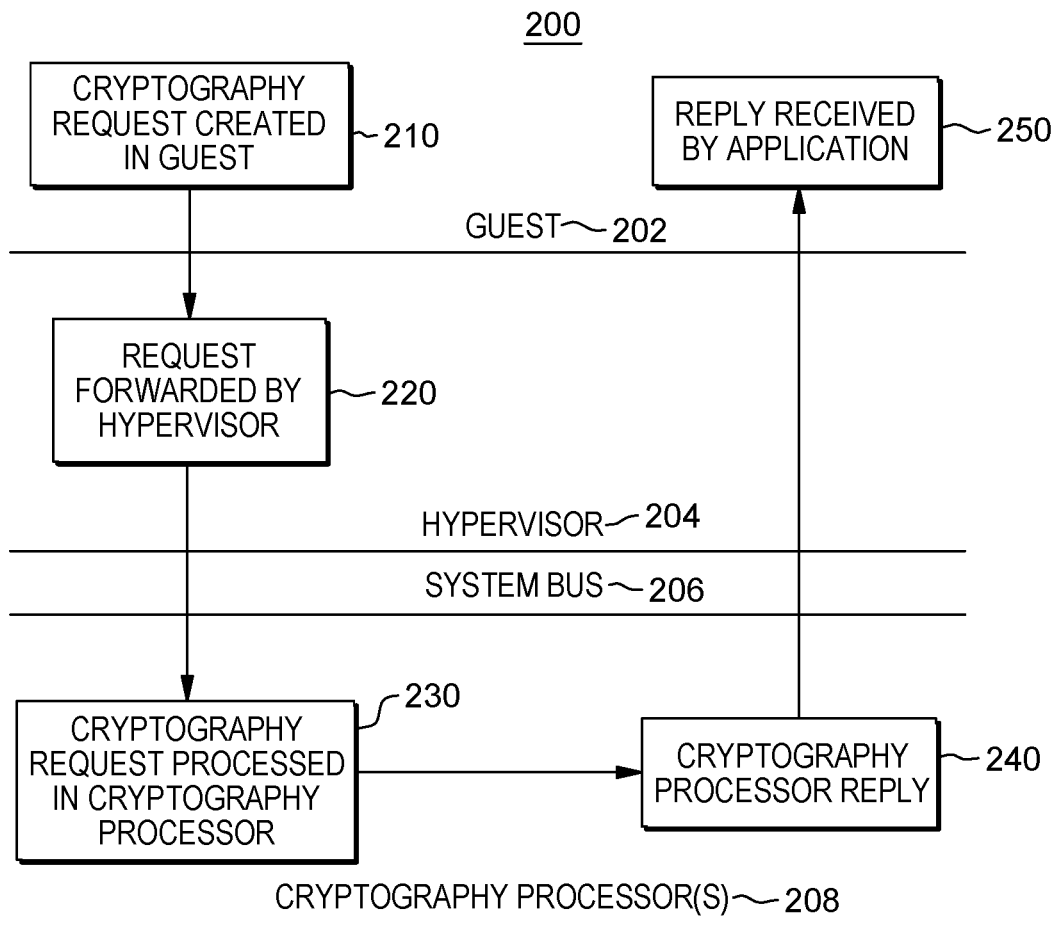
FIG. 2 depicts one embodiment of a process flow within a computing environment with secure communication, in accordance with one or more aspects of the present invention.

By way of example, FIG. 2 depicts one embodiment of a computing environment 200, where command request/reply messages (i.e., data) can use cryptographic adapter/card processing to obtain a hybrid security certificate, such as described herein. In the embodiment of FIG. 2, the cryptographic processor can be an adjunct processor such as described above in connection with the embodiments of FIGS. 1A & 1B. Referring to FIG. 2, in one embodiment, a cryptographic request 210 is created by a requester, such as a guest 202 (e.g., a guest application or a guest operating system in, for instance, a cloud environment), STEP 210. In one example, an AP command request message can be encoded, and provided to a hypervisor 204.

The cryptographic request is obtained (e.g., received, retrieved, provided, etc.) by hypervisor 204 from guest 202, and processed for forwarding, STEP 220. This processing can include, for instance, consideration of permissible command types to be processed for the requestor, based on the requestor's computing policy. Hypervisor 204 provides the request message 210 to an adjunct processor (e.g., a cryptographic processor 208). For instance, hypervisor 204 sends or forwards the request message to the adjunct processor via, for instance, a system bus 206, or the adjunct processor otherwise obtains (e.g., retrieves) the request message via system bus 206.

The adjunct processor, such as cryptographic processor 208 (in this example) processes the request, STEP 230. Assuming that the request is allowed, it is processed (e.g., operations of command are performed), and a cryptographic processor reply 240 is generated (STEP 240), which can include, in one embodiment, placing the reply in an AP command reply message, and sending it to guest 202 via, for instance, a transport layer (e.g., transport layer), STEP 250. The reply can include results of the processing, such as a generated hybrid security certificate such as described herein.

Figure 3:
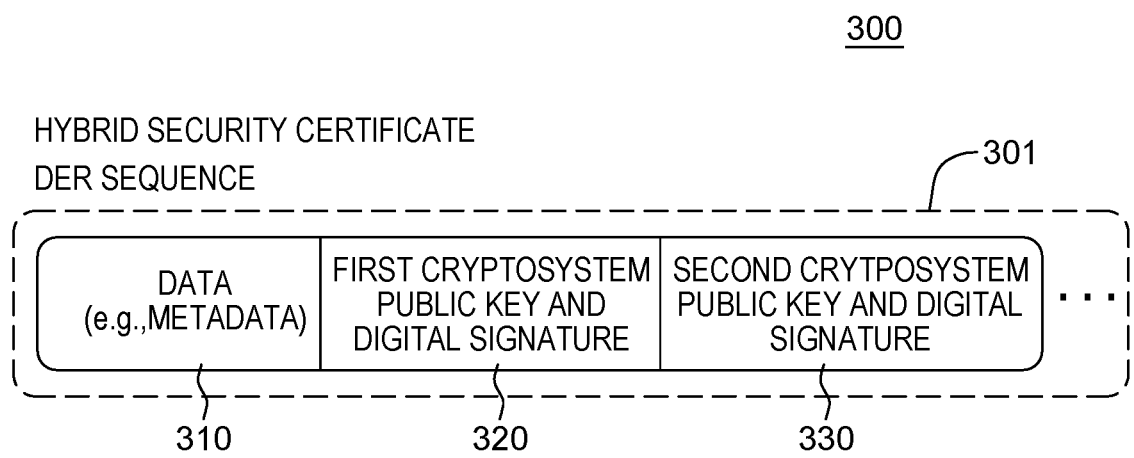
FIG. 3 is a block diagram showing an example hybrid security certificate, in accordance with one or more aspects of the present invention.

FIG. 3 depicts one embodiment of a hybrid security certificate 300 format, in accordance with one or more aspects of the present invention. As described herein, the depicted certificate broadly supports non-disruptive upward migration between different cryptographic standards, that is, between different cryptographic system approaches. Thus, as future cryptographic standards change, including length of keys, and signatures, the disclosed hybrid certificate format can be used to facilitate transition from one cryptographic standard to another. In the embodiment depicted, hybrid security certificate 300 includes multiple sections or subsections, including a data section 310, a first cryptosystem public key and digital signature section 320, and a second cryptosystem public key and digital signature section 330. Note that two cryptosystem public key and digital signature sections are provided by way of example only. As explained herein, generating the hybrid security certificate can be readily expanded to using three or more cryptosystems, in which case, each cryptosystem would have a respective section or subsection within the hybrid security certificate format depicted in FIG. 3.

As illustrated in FIG. 3, data section 310 is the certificate body and can include a message/data (e.g., metadata) to be processed and/or secured. First cryptosystem public key and digital signature 320 covers only the data 310, and is completely independent of any fields or data of the second cryptosystem public key and digital signature 330, and second cryptosystem public key and digital signature 330 covers data 310, and has no dependency on any field or data of the first cryptosystem public key and digital signature 320. In this manner, no signature or key section in the certificate needs to be updated if an attribute of a coincident signature or key section changes. Further, as noted, the hybrid security certificate generation facility disclosed herein is extendable to any N signature format, where N is two or more signatures over the certificate body data being secured.

As illustrated, in one implementation, a Distinguished Encoding Rules (DER) sequence 301 can be used to wrap or encode the entire hybrid security certificate. Alternatively, in one or more other implementations, each section 310, 320, 330 could be wrapped with a respective DER sequence. In one implementation, the first cryptosystem public key and digital signature section 320 and the second cryptosystem public key and digital signature second 330 can be grouped as a SignerInfo block, which is associated with data section 310, as illustrated. In such an embodiment, the SignerInfo block could be wrapped with a respective DER sequence.

Figure 4:
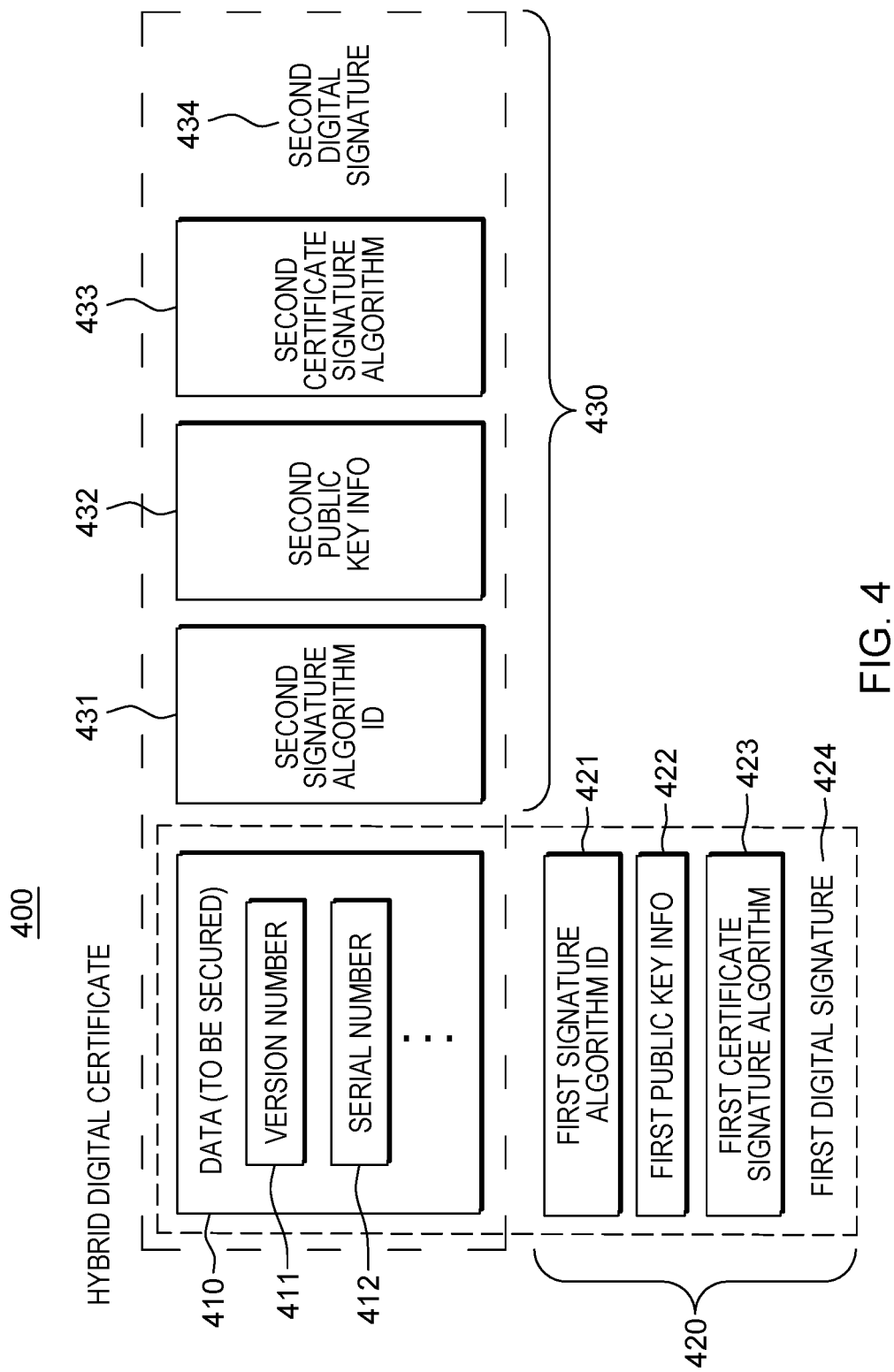
FIG. 4 is a block diagram illustrating a more detailed example of a hybrid security certificate, in accordance with one or more aspects of the present invention.

FIG. 4 depicts a more detailed representation of a hybrid digital certificate, in accordance with one or more aspects of the present invention. In the embodiment of FIG. 4, the hybrid digital certificate 400 includes data for inclusion in the certificate 410. For instance, in one embodiment, the data being secured includes metadata, such as a version number 411, serial number 412, etc., and/or a message or other data. Data 410 is covered or secured by a first cryptosystem public key and digital signature 420, as well as by a second cryptosystem public key and digital signature 430, with the first and second cryptosystem information being fully independent of each other, and there being no overlap in keys, signatures or other attributes between the first and second cryptosystem information.

As illustrated, in one embodiment, the first cryptosystem public key and digital signature 420 can include a first signature algorithm ID 421, first public key information 422, and a first certificate signature algorithm 423, with that information, as well as data 410 being digitally signed or secured by a first digital signature 424 associated with (e.g., provided pursuant to) the first cryptosystem.

Similarly, second cryptosystem public key and digital signature 430 can include, for instance, a second signature algorithm ID 431, second public key information 432, and a second certificate signature algorithm 433, with that information, along with data 410 being digitally signed or secured by the second digital signature 434 associated with (e.g., provided pursuant to) the second cryptosystem. In this manner, the first and second cryptosystem public keys and digital signatures are completely independent of each other, while both still protect the data within the hybrid digital certificate.

Details of one embodiment of aspects related to facilitating processing within a computing environment are summarized below with reference to FIGS. 5A-5B.

Referring to FIG. 5A, in one embodiment, a processor, such as an adjunct processor, generates a hybrid security certificate using multiple cryptosystems 500. Generating the hybrid security certificate includes: obtaining data for inclusion in the hybrid security certificate 502, generating a first digital signature associated with a first cryptosystem of the multiple cryptosystems to cover the data 504; and generating a second digital signature associated with a second cryptosystem of the multiple cryptosystems to cover the data 506. Further, generating the hybrid security certificate includes providing the hybrid security certificate, where the hybrid security certificate includes the data, the first digital signature associated with the first cryptosystem, and the second digital signature associated with the second cryptosystem, and where the first digital signature has no dependency on a key of the second cryptosystem or the second digital signature, and the second digital signature has no dependency on a key of the first cryptosystem or the first digital signature 508.

In one embodiment, generating the first digital signature associated with the first cryptosystem covers the data independent of the second cryptosystem, and generating the second digital signature associated with the second cryptosystem covers the data independent of the first cryptosystem, where the data does not include or depend on any attribute or key of the first cryptosystem for the second cryptosystem 510.

In one or more implementations, the first cryptosystem includes an asymmetric cryptosystem, and the second cryptosystem includes a quantum-resistant cryptosystem 512. In one embodiment, the quantum-resistant cryptosystem includes a lattice-based cryptographic approach. For instance, in one or more embodiments, the first cryptosystem includes an elliptic-curve cryptography (ECC) cryptosystem, and the second cryptosystem include a Dilithium cryptosystem 516.

Referring to FIG. 5B, in one embodiment, generating the hybrid security certificate further includes associating a first public key with the data, where the first public key is associated with the first cryptosystem, and where generating the first digital signature uses a first private key in generating the first digital signature associated with the first cryptosystem to cover the data, and generating the first digital signature uses properties of the first public key 518.

In one embodiment, generating the hybrid security certificate further includes associating a second public key with the data, where the second public key is associated with the second cryptosystem, and where generating the second digital signature uses a second private key in generating the second digital signature associated with the second cryptosystem to cover the data, where generating the second digital signature also uses properties of the second public key 520.

In one or more embodiments, generating the hybrid security certificate further includes generating a third digital signature associated with a third cryptosystem to cover the data, where providing the hybrid security certificate includes providing the hybrid security certificate with the data, the first digital signature associated with the first cryptosystem, the second digital signature associated with the second cryptosystem, and the third digital signature associated with the third cryptosystem, and where there is no dependency between the first digital signature, the second digital signature, and the third digital signature 522.

In one embodiment, providing the hybrid security certificate includes wrapping the data, the first digital signature, and the second digital signature, in a single Distinguished Encoding Rule (DER) sequence 524. In one or more embodiments, the hybrid security certificate includes a SignerInfo block including a first public key associated with the first cryptosystem, the first digital signature, and a second public key associated with the second cryptosystem and the second digital signature 526.

Advantageously, the hybrid security certificate generation facility, and hybrid security certificate format disclosed herein can be used in a variety of computing environments, including, for instance, in a public key infrastructure environment. In such an environment, cryptography systems can be used to communicate securely over public channels. For instance, some cryptosystems provide confidentiality by encrypting messages, and some cryptosystems provide authenticity through digital signatures. Many cryptosystems include protocols that use cryptographic keys. For instance, in a public key infrastructure (PKI), the cryptographic keys include public and private keys for each entity, and a certificate authority can issue security certificates to certify the public keys. In one or more implementations, the certificate authority can utilize hybrid security certificates such as disclosed herein.

Other variations and embodiments are possible.

A hybrid security certificate facility of one or more aspects of the present invention may be incorporated and used in many computing environments. One example computing environment is described with reference to FIG. 6A. As an example, the computing environment is based on the z/Architecture® hardware architecture, offered by International Business Machines Corporation, Armonk, New York. The z/Architecture hardware architecture, however, is only one example architecture. The computing environment can also be based on other architectures, including, but not limited to, the Intel x86 architectures, other architectures of International Business Machines Corporation, and/or architectures of other companies.

As shown in FIG. 6A, a computing environment 600 includes, for instance, a computer system 602 shown, e.g., in the form of a general-purpose computing device. Computer system 602 may include, but is not limited to, one or more processors or processing units 604 (e.g., central processing units (CPUs)), a memory 606 (a.k.a., system memory, main memory, main storage, central storage or storage, as examples), and one or more input/output (I/O) interfaces 608, coupled to one another via one or more buses and/or other connections 610.

Bus 610 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 606 may include, for instance, a cache 612, such as a shared cache, which may be coupled to local caches 614 of processors 604. Further, memory 606 may include one or more programs or applications 616, at least one operating system 618, one or more computer readable program instructions 620 and multiple cryptosystems 622. Computer readable program instructions 620 and cryptosystems 622 can be configured to carry out functions of embodiments of aspects of the invention.

In one embodiment, memory 606 (e.g., at least a hardware system area of memory 606) is coupled to one or more adjunct processors 621 via one or more adjunct processor buses 623, and in one or more embodiments, via an AP transport layer.

Computer system 602 can communicate via, e.g., I/O interfaces 608 with one or more external devices 630, such as a user terminal, a tape drive, a pointing device, a display, and one or more data storage devices 634, etc. A data storage device 634 can store one or more programs 636, one or more computer readable program instructions 638, and/or data, etc. The computer readable program instructions can be configured to carry out functions of embodiments of aspects of the invention.

Computer system 602 can also communicate via, e.g., I/O interfaces 608 with network interface 632, which enables computer system 602 to communicate with one or more networks, such as a local area network (LAN), a general wide area network (WAN), and/or a public network (e.g., the Internet), providing communication with other computing devices or systems.

Computer system 602 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 602. Examples, include, but are not limited to: microcode, device drivers, redundant processing units, external disk drive arrays, RAID systems, tape drives, and data archival storage systems, etc.

Computer system 602 can be operational with numerous other general-purpose or special purpose computing system environments or configurations. Examples of well-known computing systems, environments, and/or configurations that may be suitable for use with computer system 602 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6B:
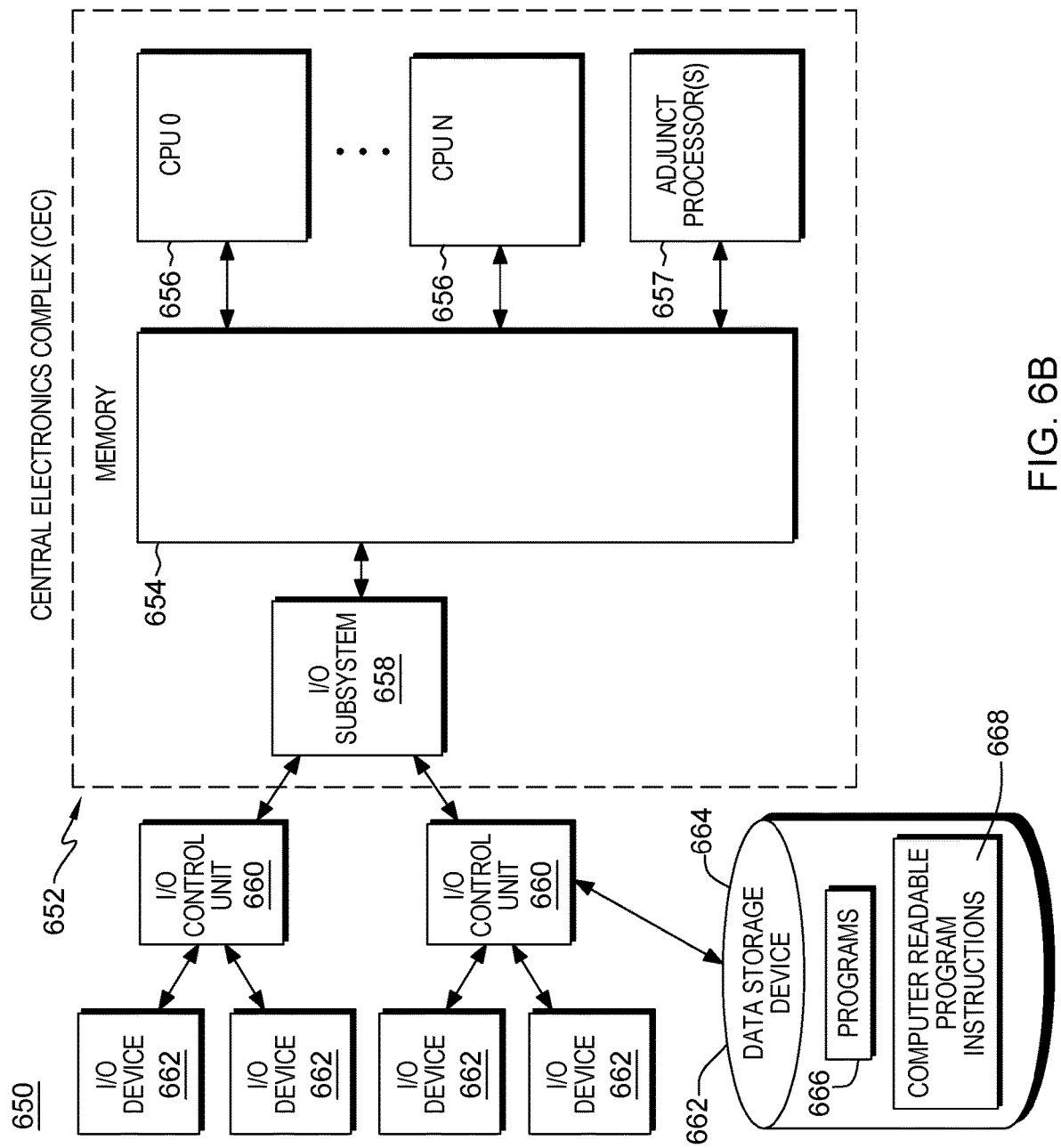
FIG. 6B depicts another example of a computing environment to incorporate and use one or more aspects of the present invention.

Another example of a computing environment to incorporate and use one or more aspects of the present invention is described below with reference to FIG. 6B. As an example, the computing environment of FIG. 6B can be based on the z/Architecture® hardware architecture offered by International Business Machines Corporation. The z/Architecture hardware architecture, however, is only one example architecture. Again, the computing environment may also be based on other architectures, including, but not limited to, the Intel x86 architectures, other architectures of International Business Machines Corporation, and/or architectures of other companies.

In one example, a computing environment 650 includes a central electronics complex (CEC) 652. CEC 652 includes a plurality of components, such as, for instance, a memory 654 (a.k.a., system memory, main memory, main storage, central storage, storage) coupled to one or more processors (a.k.a., central processing units (CPUs)) 656 and to an input/output (I/O) subsystem 658. Further, in one embodiment, memory 654 (e.g., at least a hardware system area of memory 654) is coupled to one or more adjunct processors 657 via one or more adjunct processor buses and, in one or more embodiments, via an AP transport layer.

I/O subsystem 658 can be a part of the central electronics complex or separate therefrom. It directs the flow of information between main storage 654 and input/output control units 660 and input/output (I/O) devices 662 coupled to the central electronics complex.

Many types of I/O devices may be used. One particular type is a data storage device 664. Data storage device 664 can store one or more programs 666, one or more computer readable program instructions 668, and/or data, etc. The computer readable program instructions can be configured to carry out functions of embodiments of aspects of the invention.

Central electronics complex 652 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 652. Examples include, but are not limited to: microcode, device drivers, redundant processing units, external disk drive arrays, RAID systems, tape drives, and data archival storage systems, etc.

Further, central electronics complex 652 can be operational with numerous other general-purpose or special-purpose computing system environments or configurations. Examples of well-known computing systems, environments, and/or configurations that may be suitable for use with central electronics complex 652 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6D:
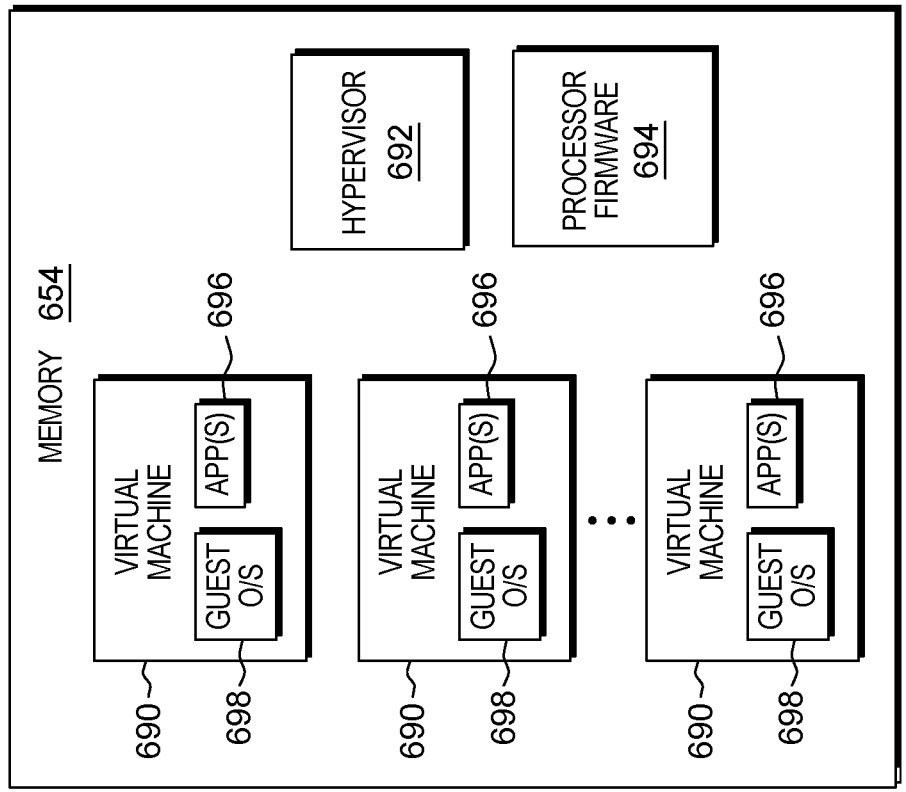
FIG. 6D depicts another example of further details of a memory of FIG. 6B, in accordance with one or more aspects of the present invention.
Figure 6C:
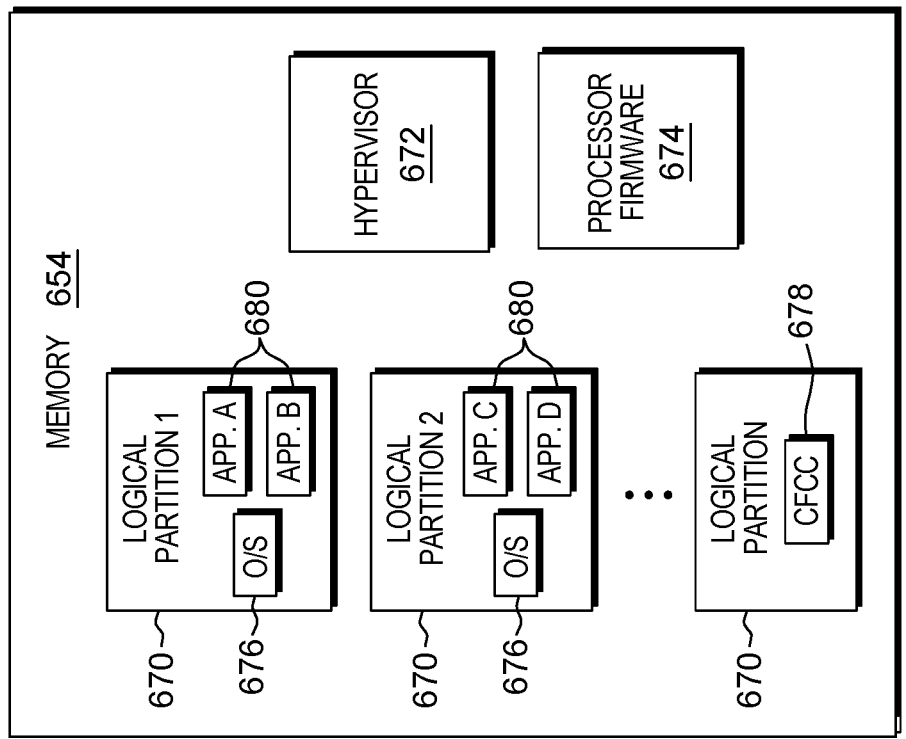
FIG. 6C depicts one example of further details of a memory of FIG. 6B, in accordance with one or more aspects of the present invention.

Central electronics complex 652 provides in one or more embodiments logical partitioning and/or virtualization support. In one embodiment, as shown in FIG. 6C, memory 654 includes, for example, one or more logical partitions 670, a hypervisor 672 that manages the logical partitions, and processor firmware 674. One example of hypervisor 672 is the Processor Resource/System Manager (PRISM), offered by International Business Machines Corporation, Armonk, New York. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 670 is capable of functioning as a separate system. That is, each logical partition can be independently reset, run a guest operating system 676 such as the z/OS® operating system, offered by International Business Machines Corporation, Armonk, New York, or other control code 678, such as coupling facility control code (CFCC), and operate with different programs 680. An operating system or application program running in a logical partition appears to have access to a full and complete system, but in reality, only a portion of it is available. Although z/OS is offered as an example, other operating systems may be used in accordance with one or more aspects of the present invention.

Memory 654 is coupled to CPUs 656 (FIG. 6B), which are physical processor resources that can be allocated to the logical partitions. For instance, a logical partition 670 includes one or more logical processors, each of which represents all or a share of a physical processor resource 656 that can be dynamically allocated to the logical partition.

In yet a further embodiment, the central electronics complex provides virtual machine support (either with or without logical partitioning support). As shown in FIG. 6D, memory 654 of central electronics complex 652 includes, for example, one or more virtual machines 690, a virtual machine manager, such as a hypervisor 692, that manages the virtual machines, and processor firmware 694. One example of hypervisor 692 is the z/VM® hypervisor, offered by International Business Machines Corporation, Armonk, New York. The hypervisor is sometimes referred to as a host. z/OS and z/VM are trademarks or registered trademarks of International Business Machines Corporation in at least one jurisdiction.

The virtual machine support of the CPC provides the ability to operate large numbers of virtual machines 690, each capable of operating with different programs 696 and running a guest operating system 698, such as the Linux® operating system. Each virtual machine 690 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 7A:
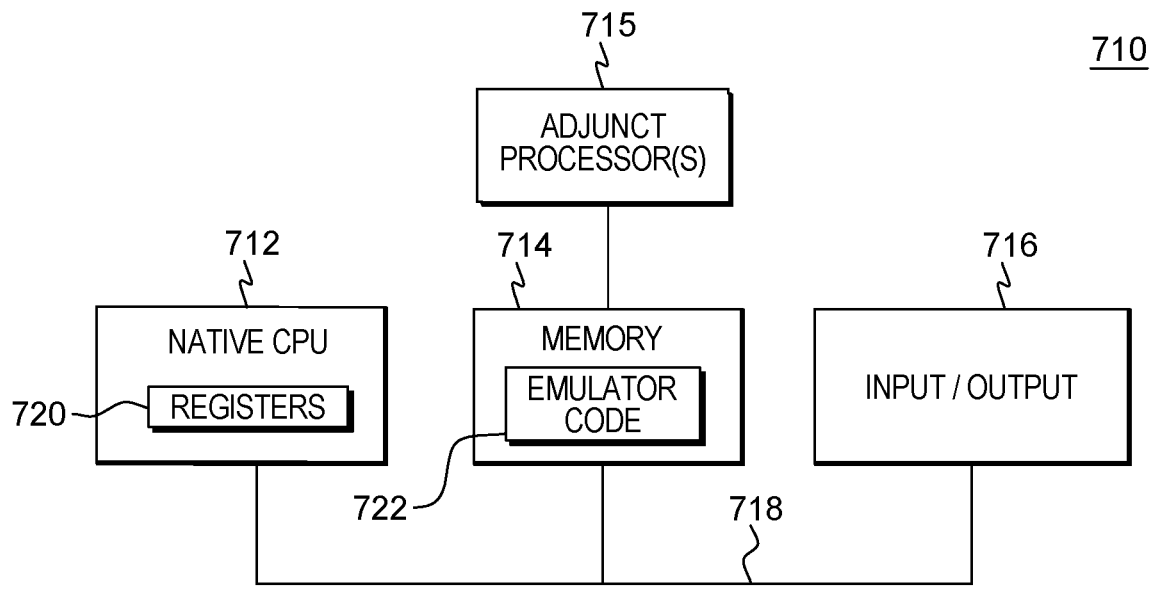
FIG. 7A depicts another example of a computing environment to incorporate and use one or more aspects of the present invention.

Another embodiment of a computing environment to incorporate and use one or more aspects of the present invention is described with reference to FIG. 7A. In this example, a computing environment 700 includes, for instance, a native central processing unit (CPU) 712, a memory 714, and one or more input/output devices and/or interfaces 716 coupled to one another via, for example, one or more buses 718 and/or other connections. As examples, computing environment 710 may include a PowerPC® processor offered by International Business Machines Corporation, Armonk, New York; an HP Superdome with Intel Itanium II processors offered by Hewlett Packard Co., Palo Alto, California; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 712 includes one or more native registers 720, such as one or more general purpose registers and/or one or more special purpose registers used during processing within the environment. These registers include information that represents the state of the environment at any particular point in time.

Moreover, native central processing unit 712 executes instructions and code that are stored in memory 714. In one particular example, the central processing unit executes emulator code 722 stored in memory 714. This code enables the computing environment configured in one architecture to emulate another architecture. For instance, emulator code 722 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
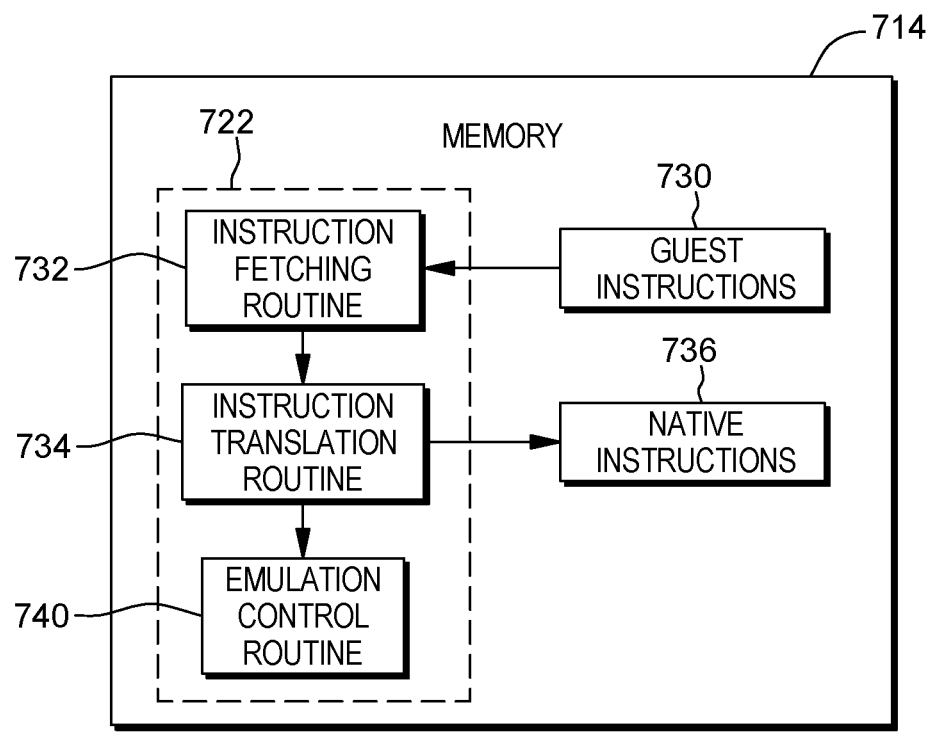
FIG. 7B depicts further details of the memory of FIG. 7A, in accordance with one or more aspects of the present invention.

Further details relating to emulator code 722 are described with reference to FIG. 7B. Guest instructions 730 stored in memory 714 comprise software instructions (e.g., correlating to machine instructions) that were developed to be executed in an architecture other than that of native CPU 712. For example, guest instructions 730 may have been designed to execute on a processor based on the z/Architecture hardware architecture, but instead, are being emulated on native CPU 712, which may be, for example, an Intel Itanium II processor. In one example, emulator code 722 includes an instruction fetching routine 732 to obtain one or more guest instructions 730 from memory 714, and to optionally provide local buffering for the instructions obtained. It also includes an instruction translation routine 734 to determine the type of guest instruction that has been obtained and to translate the guest instruction into one or more corresponding native instructions 736. This translation includes, for instance, identifying the function to be performed by the guest instruction and choosing the native instruction(s) to perform that function.

Further, emulator code 722 includes an emulation control routine 740 to cause the native instructions to be executed. Emulation control routine 740 may cause native CPU 712 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 736 may include loading data into a register from memory 714; storing data back to memory from a register; or performing some type of arithmetic or logic operation, as determined by the translation routine.

Each routine is, for instance, implemented in software, which is stored in memory and executed by native central processing unit 712. In other examples, one or more of the routines or operations are implemented in firmware, hardware, software or some combination thereof. The registers of the emulated processor may be emulated using registers 20 of the native CPU or by using locations in memory 714. In embodiments, guest instructions 30, native instructions 36 and emulator code 722 may reside in the same memory or may be disbursed among different memory devices.

Further, in one embodiment, computing environment 710 includes one or more adjunct processors 715 coupled to memory 714. The one or more adjunct processors are defined in one architecture and are configured to emulate another architecture. For example, an adjunct processor obtains guest commands of the architecture being emulated, translates the guest commands into native commands of the one architecture and executes the native commands.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for a hybrid security certificate facility, in accordance with one or more aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
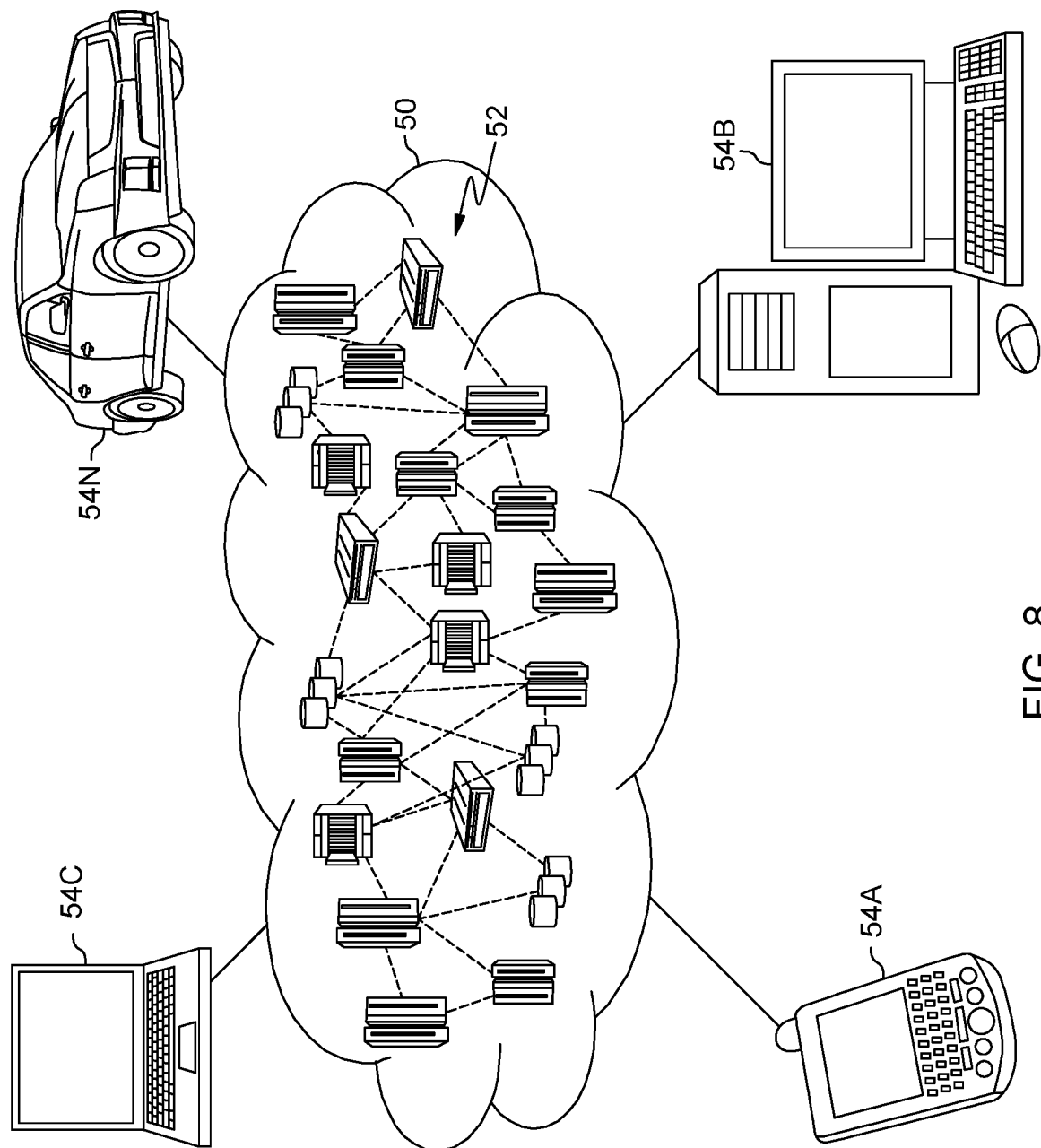
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
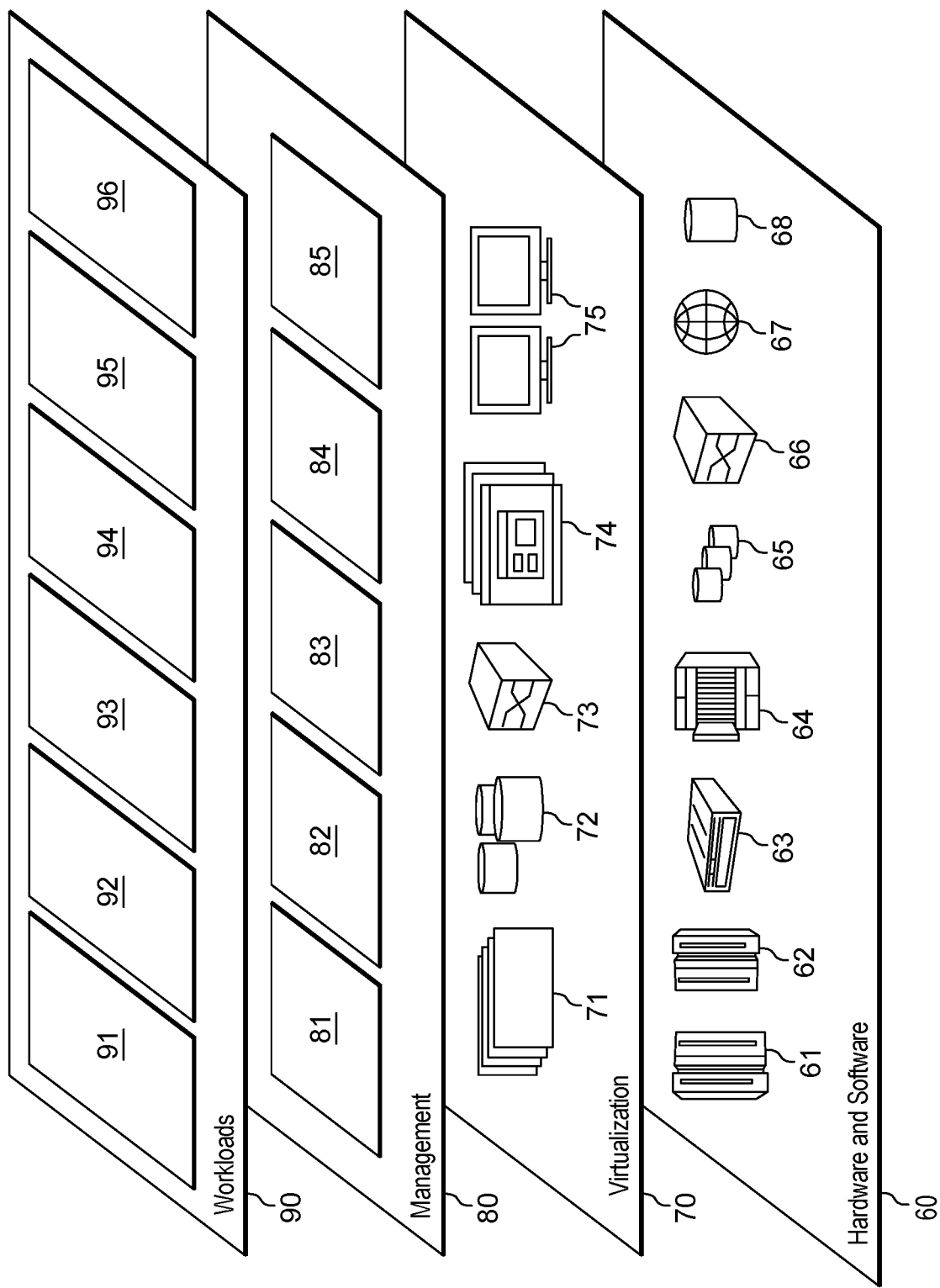
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid security certificate processing 96.

Aspects of the present invention can be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, commands or operations may be used. Additionally, different types of indications or tags may be specified. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
one or more computer-readable storage media and program instructions collectively stored on the one or more computer-readable storage media to perform a method comprising:
obtaining, by an adjunct processor of a machine of the computing environment, a request from a main processor of the machine for a security certificate, the request being obtained via a transport layer of the machine from an adjunct processor queue in system memory of the machine, wherein the main processor, the adjunct processor, the system memory with the adjunct processor queue and the transport layer are part of a common machine within the computing environment;
providing, by the adjunct processor, a reply to the request, the reply including a hybrid security certificate, and placing, via the transport layer, the reply with the hybrid security certificate on the adjunct processor queue for retrieval by the main processor, wherein the providing comprises:
generating the reply to, in part, maintain compliance of a cryptography standards organization, wherein generating the reply to, in part, maintain compliance includes generating the hybrid security certificate using multiple cryptosystems, the generating comprising:
obtaining data for inclusion in the hybrid security certificate;
generating a first digital signature associated with a first cryptosystem of the multiple cryptosystems to cover the data using a first certificate signature algorithm of the first cryptosystem applying a first cryptography standard;
generating a second digital signature associated with a second cryptosystem of the multiple cryptosystems to cover the data using a second certificate signature algorithm of the second cryptosystem applying a second cryptography standard, wherein the first cryptography standard and the second cryptography standard are different cryptography standards; and
providing the hybrid security certificate, wherein the hybrid security certificate includes a data section containing the data, a first digital signature section containing the first certificate signature algorithm, and the first digital signature associated with the first cryptosystem, and a second digital signature section containing the second certificate signature algorithm, and the second digital signature associated with the second cryptosystem, the first digital signature section and the second digital signature section of the hybrid security certificate being grouped as a SignerInfo block, and wherein the first digital signature has no dependency on a key of the second cryptosystem or the second digital signature, and the second digital signature has no dependency on a key of the first cryptosystem or the first digital signature, wherein providing the hybrid security certificate comprises: wrapping the SignerInfo block of the hybrid security certificate in a respective Distinguished Encoding Rule (DER) sequence;
wherein:
the first digital signature associated with the first cryptosystem covers the data independent of the second cryptosystem, and the second digital signature associated with the second cryptosystem covers the data independent of the first cryptosystem, where the data does not include or depend on any attribute or key of the first cryptosystem or the second cryptosystem; and
the first cryptosystem comprises an asymmetric cryptosystem certified by the standards organization and the second cryptosystem comprises a quantum-resistant cryptosystem uncertified by the standards organization, wherein the quantum-resistant cryptosystem comprises a lattice-based cryptographic approach.

2. The computer program product of claim 1, wherein the first cryptosystem comprises an elliptic-curve cryptography (ECC) cryptosystem, and the second cryptosystem comprises a Dilithium cryptosystem.

3. The computer program product of claim 1, wherein generating the hybrid security certificate further comprises:
associating a first public key with the data, the first public key being associated with the first cryptosystem; and
wherein generating the first digital signature uses a first private key in generating the first digital signature associated with the first cryptosystem to cover the data, and where generating the first digital signature uses properties of the first public key.

4. The computer program product of claim 3, wherein generating the hybrid security certificate further comprises:
associating a second public key with the data, the second public key being associated with the second cryptosystem; and
wherein generating the second digital signature uses a second private key to generate the second digital signature associated with the second cryptosystem to cover the data, and where generating the second digital signature uses properties of the second public key.

5. The computer program product of claim 1, wherein generating the hybrid security certificate further comprises:
generating a third digital signature associated with a third cryptosystem to cover the data; and
wherein providing the hybrid security certificate includes providing the hybrid security certificate with the data, the first digital signature associated with the first cryptosystem, the second digital signature associated with the second cryptosystem, and the third digital signature associated with the third cryptosystem, where there is no dependency between the first digital signature, the second digital signature, and the third digital signature.

6. The computer program product of claim 1, wherein the SignerInfo block comprises a first public key associated with the first cryptosystem and the first digital signature, and a second public key associated with the second cryptosystem and the second digital signature.

7. A computer system for facilitating processing within a computing environment, the computer system comprising:
a memory; and
at least one processor in communication with the memory, wherein the computer system is configured to perform a method, the method comprising:
obtaining, by an adjunct processor of a machine of the computing environment, a request from a main processor of the machine for a security certificate, the request being obtained via a transport layer of the machine from an adjunct processor queue in system memory of the machine, wherein the main processor, the adjunct processor, the system memory with the adjunct processor queue and the transport layer are part of a common machine within the computing environment;
providing, by the adjunct processor, a reply to the request, the reply including a hybrid security certificate, and placing, via the transport layer, the reply with the hybrid security certificate on the adjunct processor queue for retrieval by the main processor, wherein the providing comprises:
generating the reply to, in part, maintain compliance of a cryptography standards organization, wherein generating the reply to, in part, maintain compliance includes generating the hybrid security certificate using multiple cryptosystems, the generating comprising:
obtaining data for inclusion in the hybrid security certificate;
generating a first digital signature associated with a first cryptosystem of the multiple cryptosystems to cover the data using a first certificate signature algorithm of the first cryptosystem applying a first cryptography standard;
generating a second digital signature associated with a second cryptosystem of the multiple cryptosystems to cover the data using a second certificate signature algorithm of the second cryptosystem applying a second cryptography standard, wherein the first cryptography standard and the second cryptography standard are different cryptography standards; and
providing the hybrid security certificate, wherein the hybrid security certificate includes a data section containing the data, a first digital signature section containing the first certificate signature algorithm, and the first digital signature associated with the first cryptosystem, and a second digital signature section containing the second certificate signature algorithm, and the second digital signature associated with the second cryptosystem, the first digital signature section and the second digital signature section of the hybrid security certificate being grouped as a SignerInfo block, and wherein the first digital signature has no dependency on a key of the second cryptosystem or the second digital signature, and the second digital signature has no dependency on a key of the first cryptosystem or the first digital signature, wherein providing the hybrid security certificate comprises: wrapping the SignerInfo block of the hybrid security certificate in a respective Distinguished Encoding Rule (DER) sequence;
wherein:
the first digital signature associated with the first cryptosystem covers the data independent of the second cryptosystem, and the second digital signature associated with the second cryptosystem covers the data independent of the first cryptosystem, where the data does not include or depend on any attribute or key of the first cryptosystem or the second cryptosystem; and
the first cryptosystem comprises an asymmetric cryptosystem certified by the standards organization and the second cryptosystem comprises a quantum-resistant cryptosystem uncertified by the standards organization, wherein the quantum-resistant cryptosystem comprises a lattice-based cryptographic approach.

8. The computer system of claim 7, further comprising:
associating a first public key with the data, the first public key being associated with the first cryptosystem, wherein generating the first digital signature uses a first private key in generating the first digital signature associated with the first cryptosystem to cover the data, the generating the first digital signature using properties of the first public key; and
associating a second public key with the data, the second public key being associated with the second cryptosystem, wherein generating the second digital signature uses a second private key to generate the second digital signature associated with the second cryptosystem to cover the data, the generating the second digital signature using properties of the second public key.

9. The computer system of claim 7, further comprising:
generating a third digital signature associated with a third cryptosystem to cover the data; and
wherein providing the hybrid security certificate includes providing the hybrid security certificate with the data, the first digital signature associated with the first cryptosystem, the second digital signature associated with the second cryptosystem, and the third digital signature associated with the third cryptosystem, where there is no dependency between the first digital signature, the second digital signature, and the third digital signature.

10. A computer-implemented method of facilitating processing within a computing environment, the computer-implemented method comprising:
obtaining, by an adjunct processor of a machine of the computing environment, a request from a main processor of the machine for a security certificate, the request being obtained via a transport layer of the machine from an adjunct processor queue in system memory of the machine, wherein the main processor, the adjunct processor, the system memory with the adjunct processor queue and the transport layer are part of a common machine within the computing environment;
providing, by the adjunct processor, a reply to the request, the reply including a hybrid security certificate, and placing, via the transport layer, the reply with the hybrid security certificate on the adjunct processor queue for retrieval by the main processor, wherein the providing comprises:
    generating the reply to, in part, maintain compliance of a cryptography standards organization, wherein generating the reply to, in part, maintain compliance includes generating the hybrid security certificate using multiple cryptosystems, the generating comprising:
        obtaining data for inclusion in the hybrid security certificate;
        maintaining compliance of a standards organization by generating a first digital signature associated with a first cryptosystem of the multiple cryptosystems to cover the data using a first certificate signature algorithm of the first cryptosystem applying a first cryptography standard;
        generating a second digital signature associated with a second cryptosystem of the multiple cryptosystems to cover the data using a second certificate signature algorithm of the second cryptosystem applying a second cryptography standard, wherein the first cryptography standard and the second cryptography standard are different cryptography standards; and
    providing the hybrid security certificate, wherein the hybrid security certificate includes a data section containing the data, a first digital signature section containing the first certificate signature algorithm, and the first digital signature associated with the first cryptosystem, and a second digital signature section containing the second certificate signature algorithm, and the second digital signature associated with the second cryptosystem, the first digital signature section and the second digital signature section of the hybrid security certificate being grouped as a SignerInfo block, and wherein the first digital signature has no dependency on a key of the second cryptosystem or the second digital signature, and the second digital signature has no dependency on a key of the first cryptosystem or the first digital signature, wherein providing the hybrid security certificate comprises:
        wrapping the SignerInfo block of the hybrid security certificate in a respective Distinguished Encoding Rule (DER) sequence;
    wherein:
        the first digital signature associated with the first cryptosystem covers the data independent of the second cryptosystem, and the second digital signature associated with the second cryptosystem covers the data independent of the first cryptosystem, where the data does not include or depend on any attribute or key of the first cryptosystem or the second cryptosystem; and
        the first cryptosystem comprises an asymmetric cryptosystem certified by the standards organization and the second cryptosystem comprises a quantum-resistant cryptosystem uncertified by the standards organization, wherein the quantum-resistant cryptosystem comprises a lattice-based cryptographic approach.

11. The computer-implemented method of claim 10, wherein generating the hybrid security certificate further comprises:
associating a first public key with the data, the first public key being associated with the first cryptosystem, wherein generating the first digital signature uses a first private key in generating the first digital signature associated with the first cryptosystem to cover the data, the generating the first digital signature using properties of the first public key; and
associating a second public key with the data, the second public key being associated with the second cryptosystem, wherein generating the second digital signature uses a second private key to generate the second digital signature associated with the second cryptosystem to cover the data, the generating the second digital signature using properties of the second public key.

* * * * *